United States Patent [19]

Nosaka

[11] 4,296,640
[45] Oct. 27, 1981

[54] POWER TRANSMISSION V-BELT AND METHOD OF MANUFACTURE

[75] Inventor: Soukichi Nosaka, Kobe, Japan
[73] Assignee: Mitsuboshi Belting Ltd., Kobe, Japan
[21] Appl. No.: 44,289
[22] Filed: May 31, 1979
[30] Foreign Application Priority Data Dec. 16, 1978 [JP] Japan .............................. 53-156030

[51] Int. Cl.$^3$ .......................... F16G 5/16; F16G 5/00
[52] U.S. Cl. .................................. 474/262; 474/263; 474/264; 474/265; 156/142
[58] Field of Search .................. 74/232, 233; 156/137, 156/139, 140, 142; 474/261-265

[56] References Cited

U.S. PATENT DOCUMENTS

| | | | |
|---|---|---|---|
| 2,054,619 | 9/1936 | Freedlander | 74/233 |
| 2,430,024 | 11/1947 | Luaces et al. | 474/261 |
| 2,711,778 | 6/1955 | Waugh | 156/140 |
| 3,051,212 | 8/1962 | Daniels | 474/263 |
| 3,667,308 | 6/1972 | Schwab et al. | 474/264 |
| 3,987,684 | 10/1976 | Fisher et al. | 74/233 |
| 4,022,070 | 5/1977 | Wolfe | 74/233 |
| 4,083,261 | 4/1978 | Speer et al. | 74/233 |
| 4,123,946 | 11/1978 | Hollaway | 474/263 |
| 4,127,039 | 11/1978 | Hollaway | 74/232 |
| 4,137,787 | 2/1979 | Waugh | 74/233 |
| 4,228,692 | 10/1980 | Jacob et al. | 474/263 |

*Primary Examiner*—Lawrence J. Staab
*Attorney, Agent, or Firm*—Sughrue, Mion, Zinn, Macpeak & Seas

[57] ABSTRACT

A power transmission V-belt having a tensile member (11) arranged in the form of a layer along the center line of the belt and first and second elastic rubber layers (14), (13), formed on opposite surfaces of the layer. The modulus of elasticity of the second elastic rubber layer is either equal to or smaller than that of the first elastic rubber layer. A first stretchable fabric (16) is provided on the surface of the first elastic rubber layer (14) and a second stretchable fabric (15) is provided on the surface of the second elastic rubber layer (13). The stretchability of the second stretchable fabric in the longitudinal direction is larger than that of the first stretchable fabric (16). The belt has a trapezoid cross-section. The method of manufacture comprises the steps of laying a second stretchable fabric (15) on a cylindrical drum (19) laying a first elastic rubber sheet (20) small in tension elasticity modulus on the stretchable fabric (15); spirally winding a rope-shaped tensile member (11) on the elastic rubber sheet to form a tensile member layer; laying a elastic rubber sheet (21) larger in tension elasticity modulus than the first elastic rubber sheet (20) on the tensile member layer; laying a first stretchable fabric (16) lower in stretchability than the second stretchable fabric (15) on the second elastic rubber sheet (21), to form an assembly. The assembly is subjected to vulcanization to obtain a sleeve-shaped molded belt blank, and then cut into rings to form alternately indirect molded V-belts which are turned inside out before use and direct molded V-belts which can be used without turning inside out.

16 Claims, 9 Drawing Figures

POWER TRANSMISSION V-BELT AND METHOD OF MANUFACTURE

BACKGROUND OF THE INVENTION

This invention relates to power transmission V-belts having a trapezoid cross-section and to a method of manufacturing the V-belts. More particularly, this invention relates to a power transmission V-belt comprising a tensile member arranged in the form of a layer along the center line of the belt, elastic rubber layers formed respectively on both surfaces of the layer of the tensile member, and fabric layers provided respectively on the surfaces of the elastic rubber layers. The invention also relates to a method of manufacturing the power transmission V-belt.

During the manufacture of V-belts, hardened scraps are created in the scraping step; that is, the material is uneconomically used. This invention has been developed mainly to eliminate this drawback. That is, the invention relates to a V-belt which is manufactured according to a belt blank having the layer of a tensile member along the center line thereof is cut into rings whereby direct molded belts having a trapezoid cross-section and indirect molded belts having an inverted trapezoid cross-section which are turned inside out before use are alternatively obtained. This invention is an improvement of that belt manufacturing method.

Belts of this type have been disclosed in U.S. Pat. Nos. 3,869,933 and 3,941,005, in which cord fabrics are provided on the upper and lower surface of the layer of a belt tensile member to increase the rigidity in the widthwise direction of the belt. This tends to prevent the belt from dropping in the pulley during running. However, these conventional belts are disadvantageous in that the cord fabrics are liable to peel off the layer of the tensile member because of a shearing stress applied to the belt. Also, the belt is relatively expensive.

In order to overcome this disadvantage, a belt has been proposed in U.S. Pat. No. 3,987,684, in which the same wide cross angle bias fabrics are arranged on the upper and lower surface layers of the belt, and short fibers are mixed in the both surfaces of the layer of the tensile member. This conventional belt is manufactured according to a method in which the layer of a tensile member is arranged along the center line of the belt and the same fabrics and the same rubber layers are symmetrically provided on the upper and lower surfaces of the layer of the tensile member, to form a sleeve-shaped vulcanized molded belt blank. The blank is cut into several rings, so that direct molded belts can be used as they are and indirect molded belts which must be turned inside out before use are also provided. However, it should be noted that the direct molded belt is different in performance from the indirect molded belt.

This can be ascertained with reference to FIG. 1 which is a sectional view of a sleeve-shaped vulcanized molded belt blank 7. The blank 7 is obtained according to a method in which a lower fabric 4, a lower rubber layer 6, the layer of a tensile member 2, an upper rubber layer 5 and an upper fabric 3 are laid on a cylindrical molding drum 1 in succession. The layer of the tensile member 2 is arranged along the center line thereof to form an assembly. The assembly is subjected to vulcanization. The circumferential length of the lower fabric 4 is shorter as much as $2\pi t$ (where t is the thickness of the belt) than that of the upper fabric 3.

As shown in FIG. 2, the blank 7 is obliquely cut into rings to obtain direct molded belts and indirect molded belts. When the indirect molded belt 8 is turned inside out the lower fabric 4 is forcibly made longer by $2\pi t$ than the upper fabric 3. In addition, when the indirect molded belt thus turned inside out is run on a small diameter pulley, the upper rubber layer and fabric on the layer of the tensile member is subjected to a tensile strain greater than the compression strain in the longitudinal direction of the lower member of the belt. That is, the upper member of the belt is strained more than the lower member.

As a result, the upper member of the belt may be cracked. It has been known that this crack occurs mainly in the upper fabric, or between the upper fabric and the rubber layer, but rarely occurs in the lower member of the belt. Thus, the conventional method is fatally disadvantageous in that the service life of the indirect molded belt is much shorter than that of the direct molded belt.

SUMMARY OF THE INVENTION

A power transmission V-belt according to this invention comprises; the layer of a tensile member arranged along the center line of the belt and elastic rubber layers including short fibers formed on both surfaces of the layer of the tensile member, respectively. The elastic rubber layers are equal in thickness to each other but different in the tension elasticity modulus in the longitudinal direction of the belt. Fabrics different in stretchability are laid on the elastic rubber layers having the same number of plys, respectively. Particularly, in indirectly molded V belts, the materials forming the upper member of the belt are more stretchable than those forming the lower member of the belt. Therefore, the power transmission V-belt according to the invention can positively withstand the tensile strain and the compression strain which are applied to the upper member and the lower member of the belt when the belt is run on the pulley.

According to another aspect of the invention, a method of manufacturing the power transmission V-belt according to the invention is provided.

A direct molded belt, and an indirect molded belt which is turned inside out before use, according to the invention, will be described with reference to the accompanying drawings.

DESCRIPTION OF THE PREFERRED EMBODIMENTS

Figure 1:
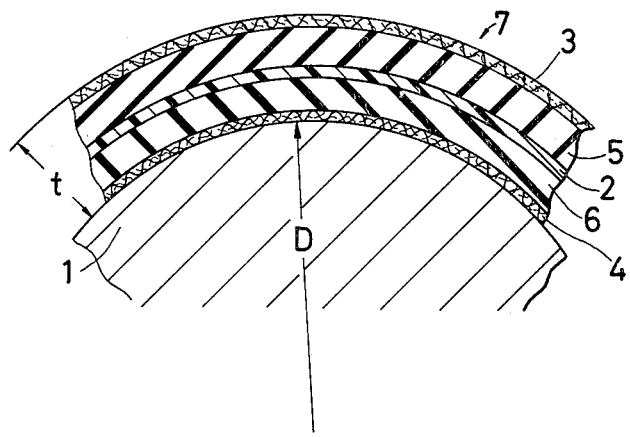
FIG. 1 is a sectional view showing a part of a conventional sleeve-shaped vulcanized molded belt blank in which a tensile member is arranged along the center line thereof.

In the accompanying drawings, reference characters A and A′, and B and B′ designate indirect molded V-belts and direct molded V-belts, respectively.

Figure 5:
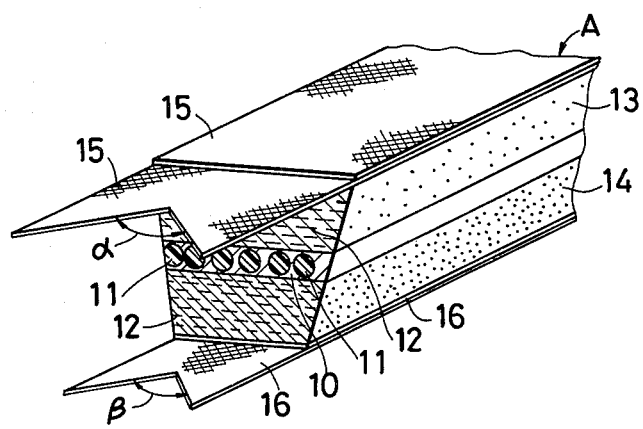
FIG. 5 is a perspective view, with parts cut away, showing an indirect molded belt according to the invention.
Figure 6:
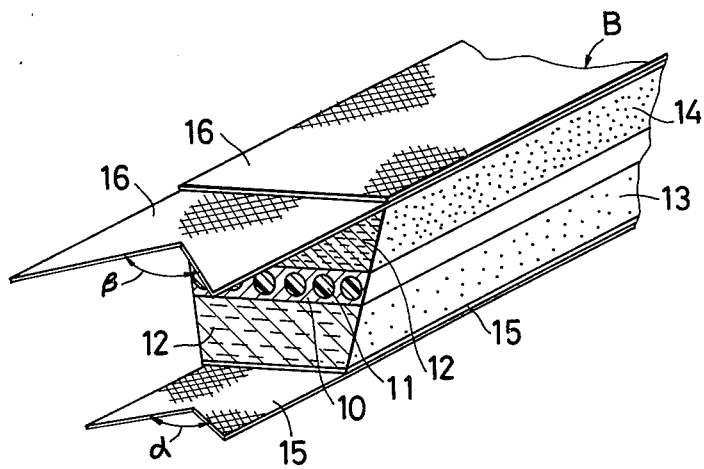
FIG. 6 is a perspective view, with parts cut away showing a direct molded belt according to the invention.

Referring now to FIG. 5 and FIG. 6, rope-like tensile members 11 made of, for instance, polyester fibers or armomatic polyamide fibers high in strength and low in elongation are covered by a cushion rubber layer 10 of high flexibility, to form a layer (hereinafter referred to as "a tensile member layer 11" when applicable). The tensile member layer 11 is arranged along the center line of the V-belt.

An elastic rubber layer 13 is disposed on one surface of the tensile member layer 11. The rubber layer 13 is obtained by mixing 5 to 25 parts by weight of short fibers 12, 0.025–1.30 mm in diameter and 1–20 mm in length, such as nylon fibers, cotton fibers, polyester fibers or rayon fibers in 100 parts by weight of rubber material such as NR, SRB or CR in such a manner that the short fibers extend laterally of the belt. Another elastic rubber layer 14 is placed the other surface of the tensile member layer 11. The rubber layer 14 is obtained by mixing 10 to 30 parts by weight of short fibers 12 in 100 parts by weight of rubber material similarly as in the rubber layer 13. Its elasticity in the longitudinal direction of the belt is equal to or greater than that of the rubber layer 13.

One to four plys of stretchable fabrics 15 are disposed on the surface of the elastic rubber layer 13. The stretchable fabrics 15 is, for instance, a bias fabric excellent in stretchability and relatively large in the cross angle ($\alpha$) formed by the warps and wefts, the cross angle being 110 to 150 degrees. Similarly, one to four plys of stretchable fabrics 16 are disposed on the surface of the rubber layer 14. The stretchable fabric has a cross angle ($\beta$) of 80 to 100 degrees formed by the warps and wefts. The stretchability of the fabric 16 is lower than that of the fabric 15. That is, the V-belt is constructed so that the fabric 15 is clearly different in stretchability from the fabric 16, while the elstic rubber layer 13 is also clearly different in tension elasticity from the elastic rubber layer 14 with the tensile member layer 11 as the boundary.

Figure 2:
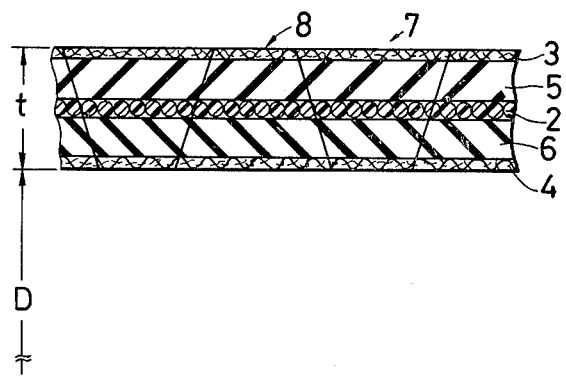
FIG. 2 is a sectional view showing a part of a sleeve-shaped vulcanized molded belt blank manufactured according to a conventional belt molding method.

Referring to FIG. 2, in which reference character D designates the inside diameter of a vulcanized sleeve 7, an indirect molded belt 8 is turned inside out with the tensile member as the center. Therefore, the circumferential length of a lower fabric 4, which forms the lower surface of the belt when the belt is molded (which will become the upper fabric when the belt is turned inside out), is increased from $\pi D$ to $\pi D + 2\pi t$. Thus, the lower fabric 4 is forcibly elongated as much as $2\pi t/\pi D \times 100 (\%)$. In an ordinary belt, the inside diameter and thickness are 80–320 mm and 6–10 mm, respectively, and therefore it is necessary that when the belt is molded, the degree of elongation of the lower fabric 4 is more than 5% of that of the upper fabric 3. That is, with the difference in the degree of elongation of this order, when the indirect molded belt is turned inside out, the upper member is subjected to tensile strain substantially equivalent to that of a direct molded belt.

Figure 3:
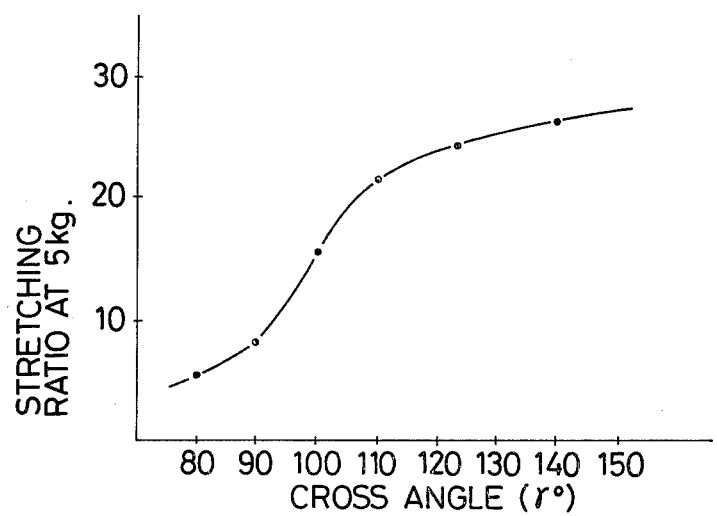
FIG. 3 is a graphical representation indicating the relations vs. cross angles formed by the wraps and wefts of a bias fabric with a load of 5 kg applied thereto.
Figure 4:
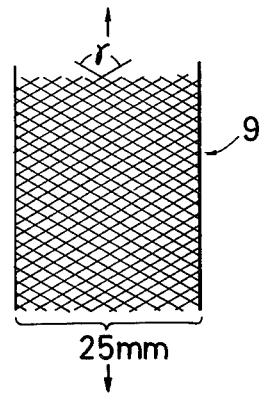
FIG. 4 is a plan view of the bias fabric used for the tension test.

FIG. 3 shows one example of the relationship between various cross angles ($\gamma$) formed by the warps and wefts of a bias fabric 9 and a stretching ratio at load of 5 kg applied thereto. The bias fabric 9 is made of cotton threads and is 25 mm in width. The bias fabric 9 is pulled in the longitudinal direction of the belt, as shown in FIG. 4.

Accordingly, in order to provide the difference in elongation more than 5% to the bias fabric in FIGS. 5 and 6, it is necessary that when the stretchable fabric 16 having a cross angle ($\beta$) of 80° to 100° is used, the stretchable fabric 15 has a cross angle ($\alpha$) of 110° to 150°. That is, it is necessary that the difference between the cross angles ($\alpha$) and ($\beta$) is about 20° to 50°. This will become more apparent from the characteristic curve indicated in FIG. 3.

On the other hand, it is preferable that the elastic rubber layer 13 be more stretchable than the elastic rubber layer 14. In other words, although these layers are obtained similarly mixing short fibers in rubber material in such a manner that the short fibers are orientated in a direction substantially perpendicular to the tension direction, they must be different in tension elasticity modulus from each other. Table 1 below shows one example of the variations of tension elasticity caused when the amount of mixture of short fibers is changed.

TABLE 1

| Amount of mixture of short fibers (parts by weight) | 0 | 5 | 10 | 15 | 25 | 35 |
|---|---|---|---|---|---|---|
| Tension elasticity (kg/cm²) | 3.8 | 4.0 | 5.1 | 6.1 | 7.3 | 15.1 |

The tension elasticity modulus (E) is expressed by the following equation.

$$E = \alpha/\epsilon$$

where, $\alpha$ is the stress, and $\epsilon$ is the strain.

The strain (%) with a load of 5 kg/cm² is indicated in Table 2 below:

TABLE 2

| Amount of mixture of short fibers (parts by weight) | 0 | 5 | 10 | 15 | 25 | 35 |
|---|---|---|---|---|---|---|
| Strain (%) | 17.5 | 20.0 | 25.5 | 30.5 | 36.5 | 75.5 |

It is apparent from the above description that in order to provide the difference in elongation of at least 5% between the elastic rubber layers 13 and 14, it is necessary that the rubber layer 13 be obtained by mixing 5 to 25 parts by weight of short fibers in 100 parts by weight of rubber. Also, the rubber layer 14 is obtained by mixing 10 to 30 parts by weight in 100 parts by weight of rubber. Thus, the difference in tension elasticity modulus in the longitudinal direction of the belt between the elastic rubber layers 13 and 14 depends on the difference in the amount of mixture of short fibers. It is 5 to 20 parts by weight of short fibers with respect to 100 parts by weight of rubber. These elastic rubber layers with short fibers can be changed by utilizing differences in the intrinsic elasticity modulus among various rubber materials.

One example of the V-belt according to the invention will be described by using specific numerical data.

FIG. 5 shows an indirect molded belt A. In the elastic rubber layer 14 laminated on the lower surface of the tensile member layer 11 arranged along the center line of the belt, the amount of short fibers mixed therein is 25 parts by weight. In the elastic rubber layer 13 laminated on the upper surface of the tensile member layer 11 the amount of short fibers mixed therein is 13 parts by weight. Thus, the amount of short fibers mixed in the elastic rubber layer 14 is larger than that in the elastic rubber layer 13. The cross angle ($\beta$) formed by the warps and wefts of the bias fabric 16 on the elastic rubber layer 14 is 100 degrees, while the cross angle ($\alpha$) formed by the warps and wefts of the bias fabric 15 on the elastic rubber layer 13 is 140 degrees. There are two plys of fabric for both the elastic rubber layers 13 and 14.

FIG. 6 shows a direct molded belt B, the arrangement of which is completely opposite to that of the indirect molded belt A (FIG. 5) in the order of the layers.

Figure 7:
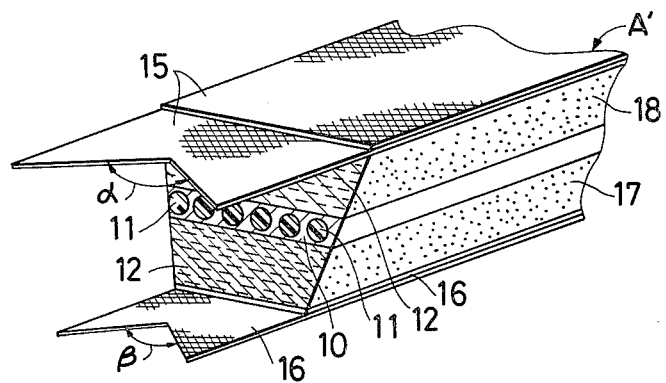
FIG. 7 is a perspective view, with parts cut away, showing one modification of the indirect molded belt according to the invention.

FIG. 7 also shows an indirect molded belt A' which is one modification of the indirect molded belt shown in FIG. 5. Elastic rubber layers 18 and 17 are laminated on the upper surface and the lower surface of a tensile member layer 11 arranged along the center line of the belt, respectively. The amount of short fibers mixed in each of the rubber layers 17 and 18 is 15 parts by weight, so that the tension elasticity modulus in the longitudinal direction of the belt of the rubber layer 17 is equal to that of the rubber layer 18. The cross angle ($\alpha$) formed by the warps and wefts of a bias fabric 15 laminated on the surface of the elastic rubber layer 18 is 120°, while the cross angle ($\beta$) formed by the warps and wefts of a bias fabric 16 laminated on the rubber layer 17 is 90 degrees. There are two plys of bias fabric for each of the rubber layers 17 and 18. It is desirable that the amount of short fibers mixed in each of the rubber layers 17 and 18 is in a range of 10 to 30 parts by weight.

Figure 8:
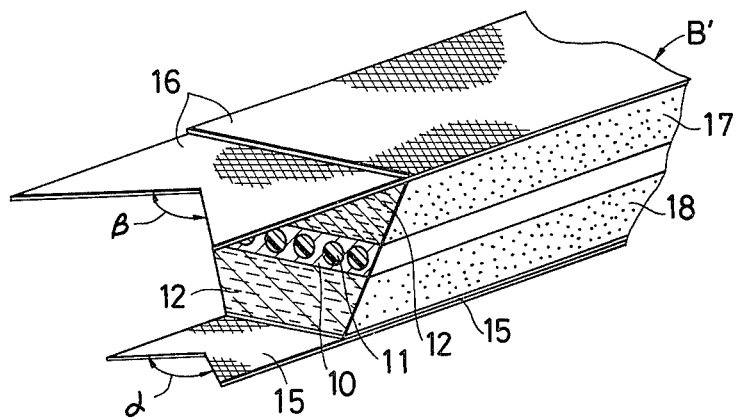
FIG. 8 is a perspective view, with parts cut away, showing one modification of the direct molded belt according to the invention.

FIG. 8 shows another example of the direct molded belt. The arrangement of this direct molded belt B' is completely opposite to that of the indirect molded belt A' (FIG. 7) in the order of the layers.

Figure 9:
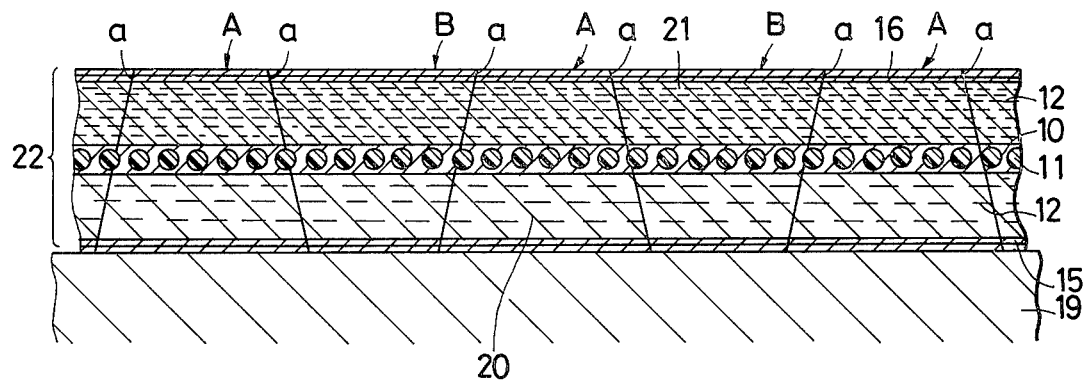
FIG. 9 is a cross-sectional view of a sleeve-shaped vulcanized molded belt blank for a description of a method of manufacturing a group of belts according to the invention.

A method of manufacturing the direct molded belts B and B', and the indirect molded belts A and A' described above will now be described with reference to FIG. 9.

A fabric 15 circumferentially stretchable on a cylindrical drum 19 is wound on the drum 19 in one to four plys. The fabric 15 is a bias fabric excellent in stretchability and having warps and wefts which form a cross angle of 110 to 155 degrees, or a plain weave stretchable fabric in which warps subjected to stretchability treatment are arranged in the circumferential direction of the drum 19 (or in the longitudinal direction of the belt). Then, a rubber sheet 20 is obtained by mixing 5 to 25 parts by weight of short fibers in 100 parts by weight of rubber material in such a manner that the short fibers extend in the widthwise direction of the drum 19 (or in the widthwise direction of the belt). The rubber sheet 20 thus obtained is wound on the fabric 15. Thereafter, a rope-like tensile member 11 made of, for instance, polyester fibers high in strength and low in elongation and covered with rubber which forms a cushion rubber layer surrounding the tensile member when molded is wound on the rubber sheet 20. An upper rubber sheet 21 is obtained by mixing 10 to 30 parts by weight of short fibers in 100 parts of rubber material, so that the tension elasticity modulus of the rubber sheet 21 is greater than or equal to that of the above-described lower rubber sheet 20. The thickness of the upper rubber sheet is equal to that of the lower rubber sheet. The upper rubber sheet 21 thus obtained is laminated on the layer of the tensile member 11. Furthermore, a fabric 16 lower in stretchability that the lower fabric 15 is laminated on the upper rubber sheet 21 having the same number of plys as that of the lower fabric 15 to form an assembly. In the case where the upper fabric 16 is a bias fabric, the warp and wefts form a cross angle ($\beta$) of 80 to 100 degrees.

The assembly thus formed is vulcanized into a sleeve-shaped molded blank 22 through conventional pressurizing and and heating processes. The molded blank 22 is cut along oblique lines (a) into several rings. That is, the direct molded V-belts B having an inverted-trapezoid section and the indirect molded V-belt A having a trapezoid section, which are opposite to one another in the order of the layers, are manufactured alternately. The indirect molded V-belts A are turned inside out before used.

As is apparent from the descriptions of the V-belts and the method of manufacturing the V-belts, the tension elasticity modulus in the longitudinal direction of the belt of the elastic rubber layer 13 is different from that of the elastic rubber layer 14 and the amount of stretchability of the fabric layer 15 is different from that of the fabric layer 16. When the direct molded V-belt B and the indirect molded V-belt A are driven, these differences result as significant differences in the effective surfaces thereof.

In the case of the direct molded V-belt B, the upper members (14 and 16) on the tensile member layer 11 is inferior in flexibility to the lower members (13 and 15) under the tensile member layer 11 because the stretchability of the fabric and the tension elasticity modulus of the elastic rubber layer of the former are different from these of the latter. However, stress applied to the upper members (14 and 16) is less than that applied to the upper member of the indirect molded V-belt A which must be turned inside out before it is used. Therefore, there is no possibility that the belt is easily cracked.

When the indirect molded V-belt turned inside out is used, a large tension is applied to the fabric layer 15 and the rubber layer 13 which are now the upper member of the belt. However, since the stretchability of the fabric layer 15 is increased and the tension elasticity modulus of the elastic rubber layer 13 is smaller than that of the other elastic rubber layer 14, the non-uniformity in quality and performance between the direct molded V-belt and the indirect molded V-belt is eliminated. That is, the quality and performance of the indirect molded V-belt are made similar to those of the direct molded V-belt. Accordingly, the method according to the invention contributes significantly to manufacturing the V-belt as uniformly as possible.

In the method of manufacturing V-belts according to the invention, the sleeve-shaped molded belt bank is cut into rings, so that the direct molded V-belts and the indirect molded V-belts are alternately obtained. Accordingly, in this method, no waste material is created; that is, the material can be economically used, and yet the manufactured V-belts are uniform is quality and performance.

Furthermore, in the method according to the invention, the fabric layer high in stretchability and the elastic rubber layer low in tension elasticity modulus are provided in lamination form on each side of the layer of the tensile member to form the sleeve-shaped molded belt blank which is cut into rings. Therefore, the quality of the indirect molded belt is substantially similar to that of the direct molded belt. Thus, the belts uniform in quality can be readily manufactured according to the invention.

What is claimed is:

1. A power transmission V-belt comprising: a tensile number (11) arranged in the form of a layer along the center line of said belt; elastic rubber layers (13, 14) formed respectively on opposite surfaces of the layer of said tensile member; fabric layers (15, 16) bonded to the outside surfaces of said elastic rubber layers respectively, said fabric layers having different amounts of stretchability in the longitudinal direction of said belt, and said belt having a trapezoid cross-section.

2. A power transmission V-belt comprising: a tensile member (11) arranged in the form of a layer along the center line of said belt; a first elastic rubber layer (14) formed on one surface of the layer of said tensile member; a second elastic rubber layer (13) formed on the opposite surface of the layer of said tensile member, the modulus of elasticity of said second elastic rubber layer being smaller than that of said first elastic rubber layer; a first stretchable fabric (16) provided on the surface of said first elastic rubber layer (14); and a second stretchable fabric (15) provided on the surface of said second elastic rubber layer (13), the stretchability of said second stretchable fabric (15) in the longitudinal direction of said belt being larger than that of said first stretchable fabric (16), said belt having a trapezoid cross-section.

3. A power transmission V-belt as claimed in claim 1 or in claim 2, wherein said second elastic rubber layer (13) with said second stretchable fabric (15) is provided on the upper surface of the layer of said tensile member (11), and said first elastic rubber layer (14) with said first stretchable fabric (16) is provided on the lower surface of the layer of said tensile member (11), to form an indirect molded V-belt turned inside out prior to use.

4. A power transmission V-belt as claimed in claim 1 or in claim 2, wherein said first elastic rubber layer (14) with said first stretchable fabric (16) is provided on the upper surface of the layer of said tensile member (11), and said second elastic rubber layer (13) with said second stretchable fabric (15) is provided on the lower surface of the layer of said tensile member (11), forming a direct molded V-belt useable without turning inside out.

5. A power transmission V-belt as claimed in claim 2, wherein said first elastic rubber layer (14) is obtained by mixing 10 to 30 parts by weight of short fibers (12) in 100 parts by weight of rubber, said second elastic rubber layer (13) obtained by mixing 5 to 25 parts by weight of short fibers (12) in 100 parts by weight of rubber, and the difference between the amount of mixture of short fibers of said first elastic rubber layer (14) and that of said second elastic rubber (13) is 5 to 20 parts by weight, whereby the tension elasticity modulus in the longitudinal direction of said belt of said first elastic rubber layer is different from that of said second elastic rubber layer.

6. A power transmission V-belt as claimed in claim 5, in which said short fibers (12) are in the range of 0.025 to 1.3 mm in diameter and in the range of 1 to 20 mm in length.

7. A power transmission V-belt as claimed in claims 1, 5, or 2 wherein said second stretchable fabric (15) larger in stretchability is a bias fabric whose warps and wefts form a cross angle ($\alpha$) of 110 to 150 degrees, while said first stretchable fabric (16) smaller in stretchability is a bias fabric whose warps and wefts form a cross angle ($\beta$) of 80 to 100 degrees, and the difference between said cross angles ($\alpha$) and ($\beta$) is in a range of from 20 degrees to 50 degrees.

8. A power transmission V-belt as claimed in claim 1 or in claim 2, in which the number of plys of said stretchable fabric (15) is equal to that of said stretchable fabric (16), and the number of plys of each stretchable fabric in the range of one to four.

9. A power transmission V-belt comprising: a tensile member (11) arranged in the form of a layer along the center line of said belt; elastic rubber layers (17) and (18) formed on the surfaces of the layer of said tensile member (11), respectively, said elastic rubber layers (17) and (18) being equal to each other in tension elasticity modulus in the longitudinal direction of said belt; and fabric layers (15) and (16) bonded to the outside surfaces to said elastic rubber layers (17) and (18), respectively, said fabrics (15) and (16) being different in the stretchability in the longitudinal direction of said belt, and said belt having a trapezoid cross-section.

10. A power transmission V-belt as claimed in claim 9, in which the stretchability of said stretchable fabric (15) bonded to the outside upper surface of said rubber layers is higher than that of said stretchable fabric (16) bonded to the outside lower surface of said rubber layers, to form an indirect molded V-belt turned inside out before use.

11. A power transmission V-belt as claimed in claim 9, wherein the stretchability of said stretchable fabric (16) bonded to the outside upper surface of said rubber layers is lower than that of said stretchable fabric (15) bonded to the outside lower surface of said rubber layers.

12. A power transmission V-belt as claimed in claims 9 or 10 where said fabric (15) higher in stretchability is a bias fabric where warps and wefts form a cross angle ($\alpha$) of 110 to 150 degrees, and said fabric (16) lower in stretchability is a bias fabric where warps and wefts from a cross angle ($\beta$) of 80 to 100 degrees, and the difference between said cross angles ($\alpha$) and ($\beta$) is in a range of from 20 degrees to 50 degrees.

13. A power transmission V-belt as claimed in claim 9, wherein each of said elastic rubber layers (17) and (18) formed on the surfaces of the layer of said tensile member (11) is obtained by mixing 10 to 30 parts by weight of short fibers (12) in 100 parts by weight of rubber in such a manner that said short fibers are orientated laterally of said belt.

14. A method of manufacturing a power transmission V-belt, comprising the steps of laying second stretchable fabric (15) on a cylindrical drum (19); laying a first elastic rubber sheet (20) small in tension elasticity modulus on said stretchable fabric (15); spirally winding a rope-shaped tensile member (11) on said elastic rubber sheet to form a tensile member layer; laying a second elastic rubber sheet (21) higher in tension elasticity modulus than said first elastic rubber sheet (20) on said tensile member layer; laying a first stretchable fabric (16) lower in stretchability than said second stretchable fabric (15) on said second elastic rubber sheet (21), to form an assembly; subjecting said assembly to vulcanization to obtain a sleeve-shaped molded belt blank; and cutting said sleeve-shaped molded belt blank into rings; whereby indirect molded V-belts turned inside out before use and direct molded V-belts useable without turning inside out are alternately obtained.

15. A method as claimed in claim 14, wherein said elastic rubber sheets (20) and (21) different in tension elasticity modulus are obtained respectively by mixing 10 to 30 parts by weight of short fibers and 5 to 25 parts by weight in 100 parts of rubber in such a manner that said short fibers extend in the widthwise direction of said drum.

16. A method as claimed in claim 14, in which said first and second fabrics (16) and (15) different in stretchability are wound stretchable circumferentially of said drum, and wherein said second fabric (15) is a bias fabric whose warps and wefts from a cross angle of 110 to 150 degrees, and said first fabric (16) is a bias fabric whose warps and wefts from a cross angle of 80 to 100 degrees.

* * * * *